UNITED STATES PATENT OFFICE.

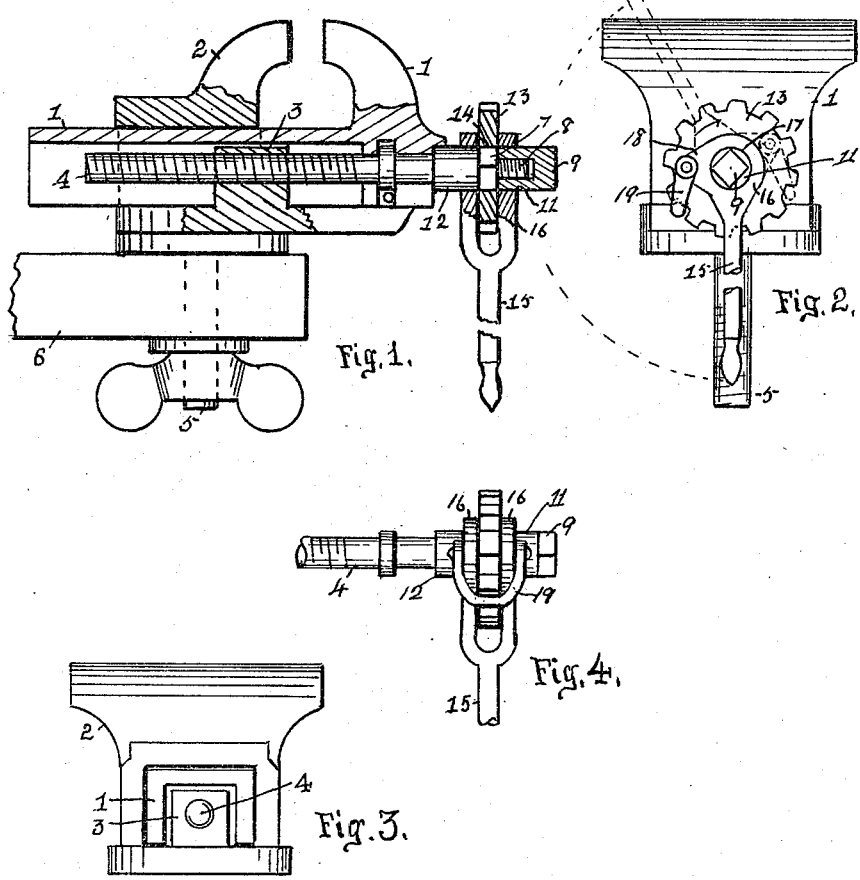

JOHN P. LEONARD, OF BROWNSVILLE, INDIANA.

VISE.

1,183,305.  Specification of Letters Patent.  Patented May 16, 1916.

Application filed August 12, 1915. Serial No. 45,238.

*To all whom it may concern:*

Be it known that I, JOHN P. LEONARD, a citizen of the United States, residing at Brownsville, Indiana, have invented a new and useful Improvement in Vises, of which the following is a specification.

My invention relates to vises and the objects of my improvements are to provide automatically reversible pawl and ratchet mechanism for actuating the screw in either of opposite directions; and to provide simple and durable construction and assemblage of the various members for securing facility of operation and efficiency of action. These objects may be attained in the following described manner as illustrated in the accompanying drawings, in which:—

Figure 1 is a side elevation with parts in section of a vise embodying my improvements; Figs. 2 and 3, respective front and rear elevations and Fig. 4 a side elevation of portions of the screw and of the pawl and ratchet mechanism thereon.

In the drawings, 1 and 2 represent the front and rear jaws of a vise, 3 the nut, 4 the screw and 5 the bolt for securing the rear jaw to the bench 6, all being constructed and arranged in the ordinary manner. The shank of the screw 4 is formed with an angular portion 7 and terminates in the threaded stud 8 whereon the nut 9 may be adjustably secured; said nut being formed with a cylindrical portion 11 of equal diameter with the portion 12 of the screw. A ratchet wheel 13 is formed with an angular axial opening 14 for the engagement therein of the angular portion 7 of the screw and whereon it may be secured by means of the nut 9.

The bifurcated lever 15 is adapted to inclose the ratchet wheel between its jaws 16 which are bored to swivel on the nut 9 and the cylindrical portion 12 of the screw. Said jaws are formed with similar lateral projections 18 whereon the U shaped pawl 19 may be pivotally secured to swing loosely by its own gravity for automatically engaging with the teeth of the ratchet wheel as shown in Fig. 2.

In operation with the hand lever in the position shown in Fig. 2 and the pawl in automatic engagement with the teeth on the ratchet wheel the screw may be turned to close the vise jaws and when in the position shown by dotted lines in Fig. 2 the screw may be turned in the opposite direction for opening said jaws. The parts may be assembled by placing the ratchet wheel between the jaws of the lever, inserting the screw therethrough with the angular portion in engagement with the corresponding angular opening in the wheel and securing it immovably in position by means of the nut, which also forms one of the journals for the lever.

Having fully described my improvements what I claim as my invention and desire to secure by Letters Patent of the United States is:—

1. The combination with a vise screw formed with a cylindrical head having a contiguous angular portion and terminating in a threaded axial projection, of a ratchet wheel formed with an angular axial opening for the removable insertion therein of the corresponding angular portion of the screw, a cylindrical nut corresponding in diameter with the cylindrical portion of the screw head and adjustable on the said projection for maintaining the ratchet wheel securely on the screw, a bifurcated hand lever having its jaws extended on opposite sides of the ratchet wheel and swiveled respectively on the nut and the head of the screw, said lever being formed with laterally extended lugs on its respective jaws and a U- or clevis-shaped pawl pivotally secured at its ends to the respective lugs and within the periphery of the ratchet wheel, for automatically engaging in either of reversed positions with the teeth of said wheel for turning the screw in corresponding opposite directions.

2. In a vise, the combination of a screw having its head portion formed with a cylindrical portion, an angular portion and terminating in a threaded stud, a ratchet wheel formed with an angular axial opening adapted to removably engage with said angular portion of the screw, a nut formed with a cylindrical portion and adjustable on the stud for clamping the ratchet wheel securely on the screw, a bifurcated lever swiveled on the nut and the cylindrical portion of the screw, and a reversible U-shaped gravity pawl pivotally secured to the lever and near the screw and arranged to automatically engage with the teeth of the ratchet wheel for turning the screw in either of opposite directions.

JOHN P. LEONARD.

Witnesses:
 BERT HEIM,
 CLIFFORD WALKER.

Copies of this patent may be obtained for five cents each, by addressing the "Commissioner of Patents, Washington, D. C."